United States Patent [19]

Kato et al.

[11] Patent Number: 5,119,002

[45] Date of Patent: Jun. 2, 1992

[54] AUTOMATIC WINDSHIELD WIPER APPARATUS WITH RAINDROP DETECTOR FOR AUTOMOTIVE VEHICLES AND METHODS FOR AUTOMATICALLY CONTROLLING WIPER APPARATUS

[75] Inventors: Masaru Kato; Masaru Inoue; Kiyoshi Konishi; Kazuya Suzuki; Takeshi Ito, all of Yokohama, Japan

[73] Assignee: Jidosha Denki Kogyo K.K., Kanagawa, Japan

[21] Appl. No.: 600,932

[22] Filed: Oct. 22, 1990

[30] Foreign Application Priority Data

Oct. 23, 1989 [JP] Japan ................................. 1-275230
Oct. 23, 1989 [JP] Japan ................................. 1-275231

[51] Int. Cl.⁵ .................................................. B60S 1/08
[52] U.S. Cl. ..................................... 318/444; 318/483; 318/DIG. 2
[58] Field of Search ............... 318/443, 444, 445, 460, 318/480, 483, DIG. 2

[56] References Cited

U.S. PATENT DOCUMENTS

| | | | |
|---|---|---|---|
| 4,317,073 | 2/1982 | Blaszkowski | 318/483 |
| 4,389,603 | 6/1983 | Kogawa et al. | 318/443 |
| 4,527,105 | 7/1985 | Shiraishi | 318/444 |
| 4,542,325 | 9/1985 | Kobayashi et al. | 318/483 |
| 4,584,508 | 4/1986 | Kobayashi et al. | 318/483 |
| 4,588,935 | 5/1986 | Kaneiwa et al. | 318/483 |
| 4,589,771 | 5/1986 | Watanabe et al. | 318/483 X |
| 4,613,802 | 9/1986 | Kraus et al. | 318/483 |
| 4,665,351 | 5/1987 | Nyberg | 318/483 |
| 4,689,535 | 8/1987 | Tsunoda et al. | 318/443 |
| 4,931,767 | 6/1990 | Albrecht et al. | 340/425.5 |
| 4,942,349 | 7/1990 | Millerd et al. | 318/483 |

FOREIGN PATENT DOCUMENTS 59-140146 8/1984 Japan.

*Primary Examiner*—Bentsu Ro
*Attorney, Agent, or Firm*—Sughrue, Mion, Zinn, Macpeak & Seas

[57] ABSTRACT

A wiper apparatus comprises a wiper motor, a wiper switch, a moisture sensor for sensing presence of moisture, a vibration sensor for sensing a vibration caused by raindrops and a controller for actuating the wiper motor in accordance with output signals from the moisture sensor and the vibration sensor. The apparatus is free from the malfunction and works automatically by sensing even a drizzling rain.

7 Claims, 8 Drawing Sheets

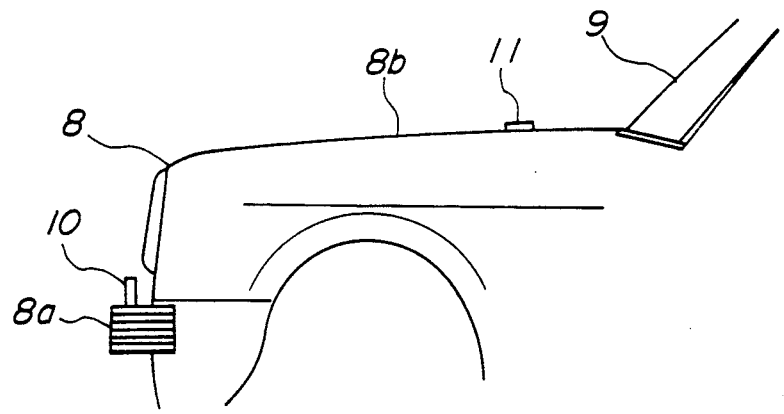
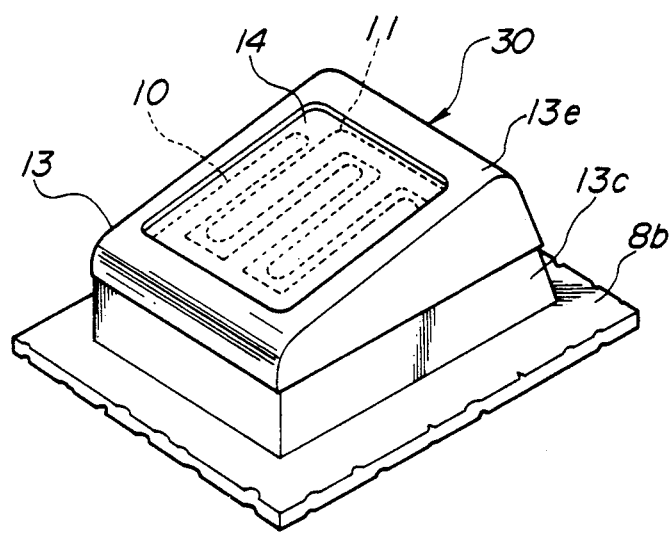
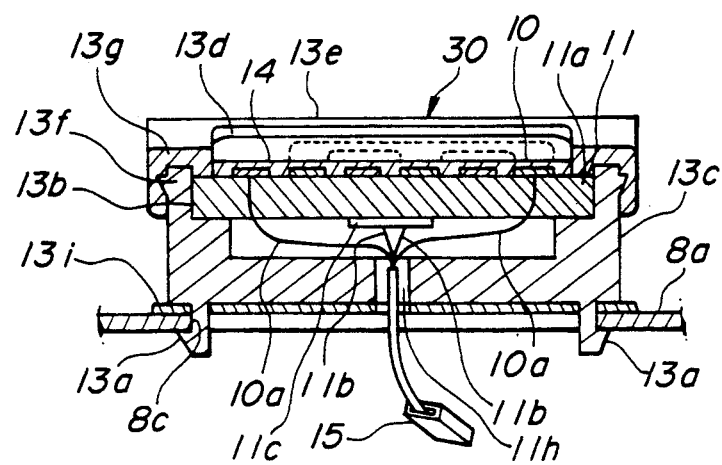

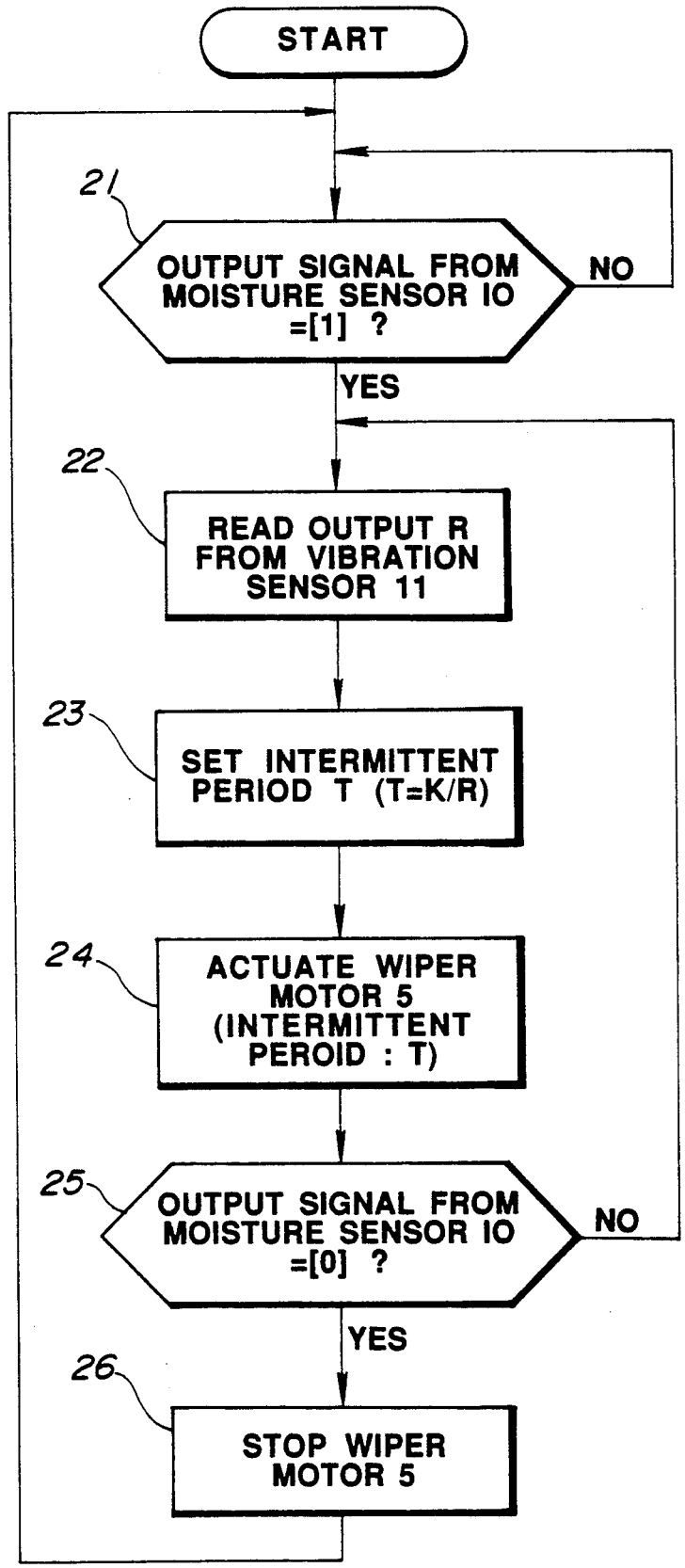

AUTOMATIC WINDSHIELD WIPER APPARATUS WITH RAINDROP DETECTOR FOR AUTOMOTIVE VEHICLES AND METHODS FOR AUTOMATICALLY CONTROLLING WIPER APPARATUS

BACKGROUND OF THE INVENTION

1. Field of the Invention

This invention relates to a wiper apparatus used for wiping raindrops away from a surface of a windshield of, for example, an automobile with a wiper blade connected with a wiper motor and, more particularly, to a wiper apparatus which works automatically by sensing moisture of raindrops or the like, and amount of rainfall.

2. Description of the Prior Art

Heretofore, in regard to a wiper apparatus which works automatically by sensing raindrops, there has been the wiper apparatus disclosed in Japanese Patent Disclosure (Kokai) No. 59-140146/1984, for example. FIG. 10 and FIG. 11 show the wiper apparatus disclosed in the above-mentioned document.

In a wiper apparatus shown in the Figures, a raindrop detector 103 which is provided with a vibration sensor 101 comprising a piezo-electric device, an electrostriction device or the like and an amplifier circuit 102 for amplifying a signal produced from vibration sensor 101, is disposed on a hood 111a of a vehicle body 111 so as to receive raindrops. Vibration caused by collision of the raindrops is sensed and transformed into an electric signal by the vibration sensor 101 at a rainfall. The electric signal is amplified by said amplifier circuit 102 provided in said rain drop detector 103 and processed in a control circuit 104, and wiper motor 107 is actuated by supplying an electric current from a power source 105 through a driving circuit 106. And a wiper blade 109 connected with the wiper motor 107 through a linkage 108 oscillates reciprocatingly on a wiped surface 110a of a windshield glass 110 so as to wipe the wiped surface 110a.

However, in the abovementioned conventional wiper apparatus 110, the vibration caused by the collision of the raindrops is simply transformed into the electric signal through the vibration sensor 101 by using merely the raindrop detector 103, accordingly, there is the possibility that the wiper apparatus 100 works by sensing the vibration caused by objects other than raindrops such as pebbles, sand, dust or the like while traveling or also vibration caused by closing the door. In the case of decreasing the sensitivity of the vibration sensor 101 in order to avoid the aforementioned trouble, there is a problem in that the wiper apparatus 100 sometimes does not work under the small rainfall such as a drizzling rain.

Furthermore, it is necessary to actuate the wiper motor 7 by manual operation when vapor in the air condenses on the windshield glass 10, or the windshield glass is doused with water splashed by a car running in the opposite direction while traveling, for example because there is no vibration to be sensed by the vibration sensor 101. Therefore, there is another problem since the manual operation is troublesome in such a case.

SUMMARY OF THE INVENTION

This invention solves the aforementioned problems of the prior art. It is an object of the present invention to provide a wiper apparatus which is possible to secure the driver's view without manual operation practically sensing moisture which is impossible to be sensed by the raindrop detector and actuate the wiper motor.

The construction of the wiper apparatus according to this invention for attaining the above-mentioned object comprises a wiper motor for driving a wiper blade, a wiper switch for selecting a mode between automatic and manual operation, a moisture sensor for sensing presence of moisture, a vibration sensor for sensing a shock caused by raindrops, a control means for actuating or stopping said wiper motor in accordance with a moisture signal output from said moisture sensor and a vibration signal output from said vibration sensor.

In the wiper apparatus according to this invention, the moisture signal output from the moisture sensor and the vibration signal output from the vibration sensor are processed by the control means, and the wiper motor works or stops automatically as a result of the above-mentioned data processing. Accordingly, the wiper apparatus is so designed as to wipe not only raindrops but also droplets of water condensed by cooling, water splashed by another car, and the like off the surface of windshield glass substantially without manual operation.

BRIEF DESCRIPTION OF THE DRAWINGS

FIG. 2 is a side view showing the moisture sensor and the vibration sensor of the wiper apparatus shown in FIG. 1 disposed on the vehicle body;

FIG. 3 is a flow chart explaining the control of the wiper apparatus shown in FIG. 1;

FIG. 5 is a perspective view of the moisture sensor and the vibration sensor of the wiper apparatus shown in FIG. 4;

FIG. 6 is a vertical sectional view of the moisture sensor and the vibration sensor shown in FIG. 5;

DESCRIPTION OF THE PREFERRED EMBODIMENTS

Figure 1:
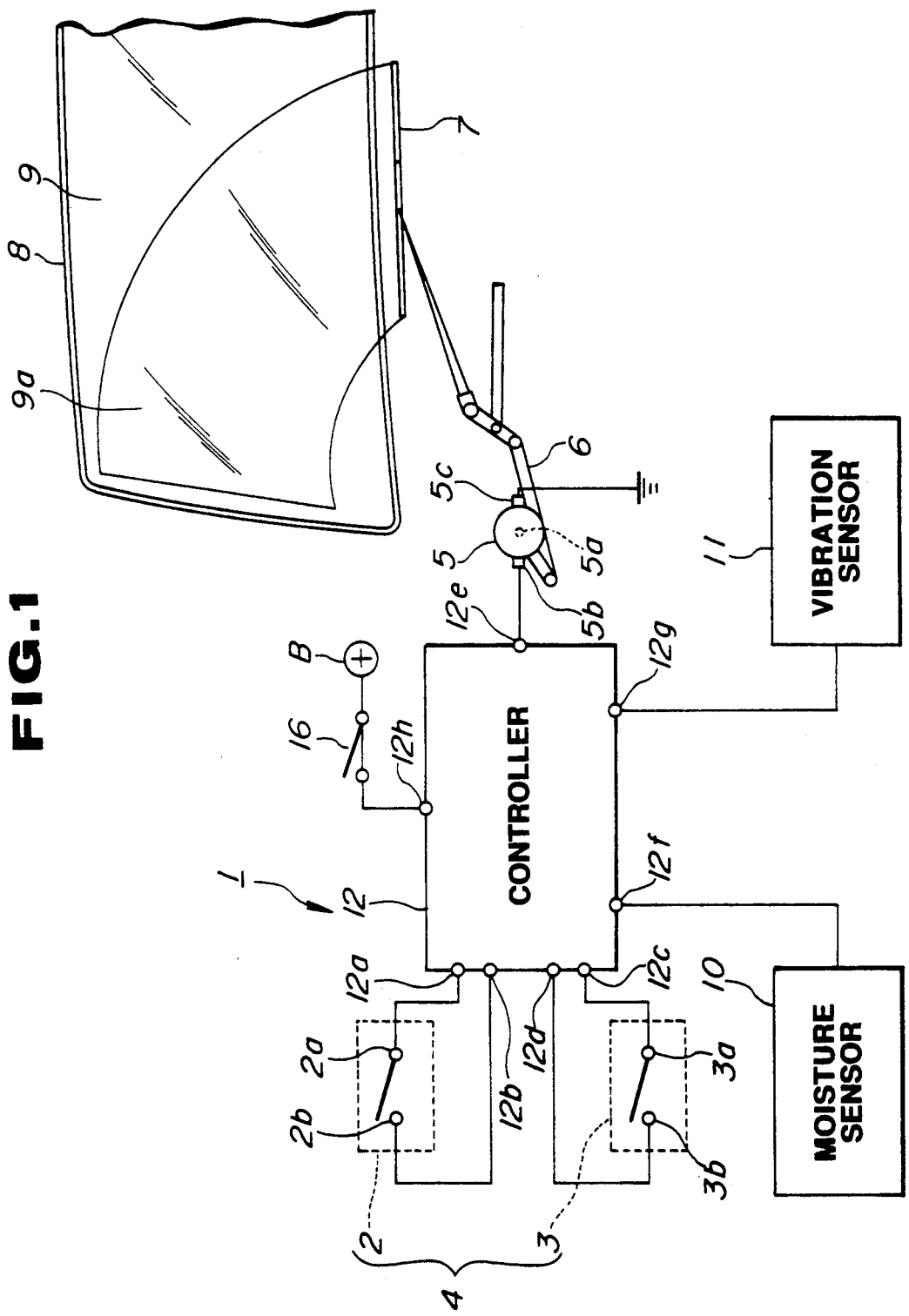
FIG. 1 is a schematic block diagram of a first embodiment of the wiper apparatus according to this invention.

An embodiment of the wiper apparatus according to this invention will be explained below on the basis of FIG. 1 to FIG. 3.

A wiper apparatus as shown in the Figures is provided with a wiper switch 4 consisting of an automating switch 2 and a manual setting switch 3, and so designed as to actuate a wiper motor 5 by manual operation after changing the manual setting switch 3 to the ON-state.

An output shaft 5a of the wiper motor 5 is connected to a wiper blade 7 through a linkage 6, the wiper blade 7 is drived by the wiper motor 5 so as to oscillate on a wiped surface 9a of a windshield glass 9 of a vehicle body 8 reciprocatingly and wipe the wiped surface 9a.

And the wiper apparatus 1 is provided with a moisture sensor 10 disposed on the front part of the vehicle body 8 and for sensing presence of moisture and outputting the moisture signal indicating the presence of the moisture, a vibration sensor 11 for sensing a shock caused by raindrops and outputting the vibration signal representing intensity of the shock caused by the raindrops, and a controller 12 for actuating or stopping the wiper motor 5 by processing the moisture signal output from the moisture sensor 10 and the vibration signal output from the vibration sensor 11.

The automating switch 2 forms a part of the wiper switch 4, a movable contact 2a of which is connected to an automating switch terminal 12a of the controller 12, and a fixed contact 2b of which is connected to another automating switch terminal 12b of the controller 12.

The manual setting switch 3 which forms another part of the wiper switch 4, a movable contact 3a which is connected to a manual setting switch terminal 12c of the controller 12 and a fixed contact 3b is connected to another manual setting switch terminal 12d of the controller 12.

A line terminal 5b of the wiper motor 5 is connected to an output terminal 12e of the controller 12 and another line terminal 5c of the wiper motor 5 is grounded.

As the moisture sensor, a ceramic moisture sensitive device made of porous sintered materials consisting of $TiO_2$ and $V_2O_5$, a dewing sensor which is provided with an electrode on an insulating substrate covered with resistive coating consisting of resin and conductive particles, and a capacitance type sensor disposed with camb teeth-like shaped two electrodes in the opposite position may be used. In this embodiment a moisture sensor 10 is constructed from the capacitance type sensor.

The moisture sensor 10 is disposed in a vertical state on a front bumper 8a of the vehicle body 8 shown in FIG. 2 as mentioned above, especially it is attached so as to sense moisture easily at the front part of the vehicle body 8.

The moisture sensor 10 is connected to an input terminal 12f of the controller 12, and is so designed as to sense the presence of moisture and to output an electric signal to the controller 12 as moisture information.

Figure 10:
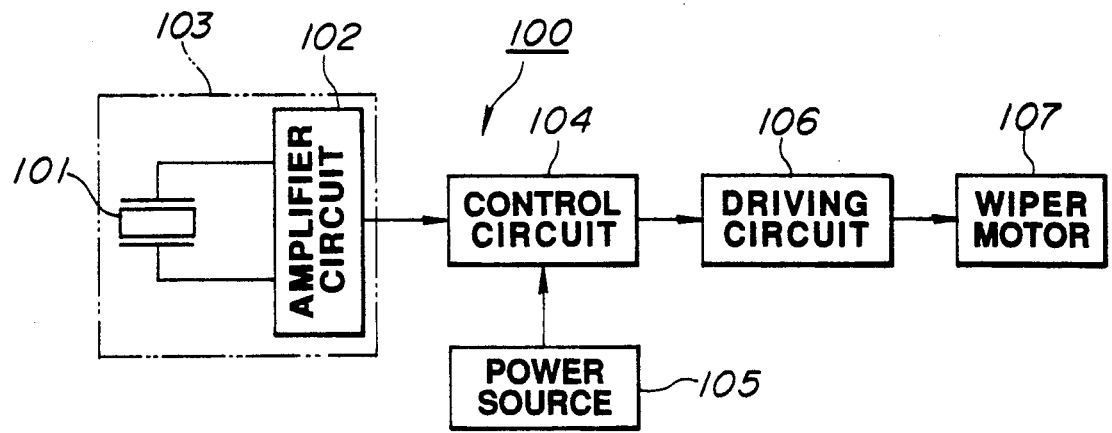
FIG. 10 is a schematic block diagram of the conventional wiper apparatus.
Figure 11:
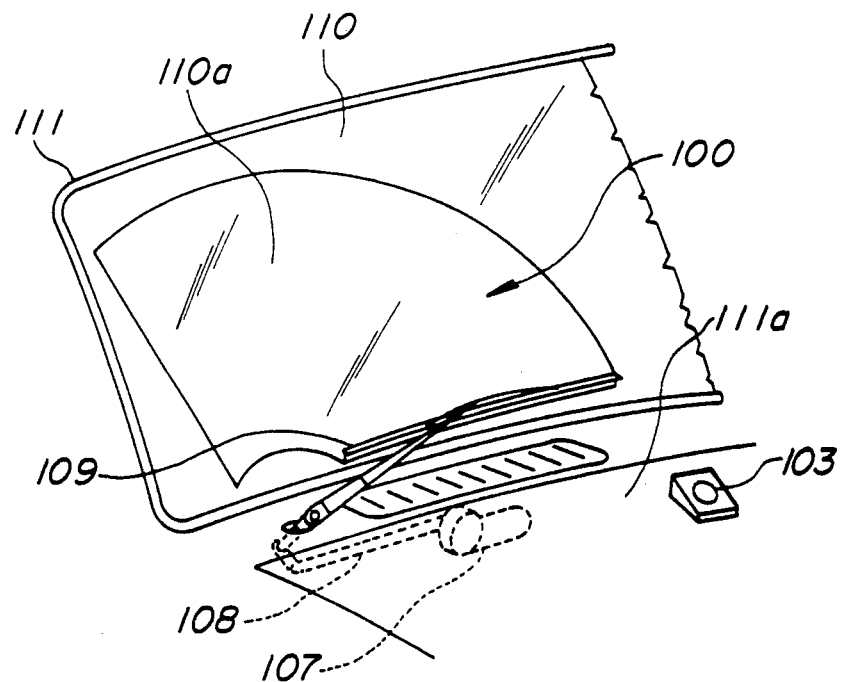
FIG. 11 is an exterior view of the conventional wiper apparatus shown in FIG. 10.

The vibration sensor 11 is constructed similarly to the raindrop detector 103 shown in FIG. 10 and senses the vibration caused by collision of raindrops by a piezoelectric device and to transform the vibration into an electric signal.

The vibration sensor 11 is disposed on a hood 8b of the vehicle body 8 to receive raindrops easily and connected to an input terminal 12g of the controller 12, designed to output the electric signal transformed from the vibration to the controller 12 as rainfall data.

The controller 12 is constructed from integrated circuits (not shown) and so on, a power terminal 12h of the controller 12 is connected to a power source B through a main switch (ignition switch) 16.

The controller 12 is so designed as to supply an electric current to the wiper motor 5 from the output terminal 12e in a case of sensing the existence of moisture and not to supply the electric current to the wiper motor 5 from the output terminal 12e in the case of sensing absence of moisture in accordance with the moisture signal output from the moisture sensor 10 when the movable contact 2a is in contact with the fixed contact 2b by changing the automating switch 2 to the ON-state.

The controller 12 calculates an intermittent period T (T=K/R, K: constant) corresponding to the output R from the vibration sensor 11, and makes the electric current to be supplied from the output terminal 12e to the wiper motor 5 into an intermittent current having the intermittent period T.

The action of the wiper apparatus 1 will be described on the basis of the flow chart shown in FIG. 3.

At the state in which the main switch (ignition switch) 16 is switched ON, and the automating switch 2 is changed to the ON-state (usually, the automating switch 2 is made to remain in the ON-state), when the vehicle body 8 gets wet with rainwater, dew, water splashed by another car or the like, the moisture sensor 10 senses the presence of moisture at step 21.

When the moisture signal output from the moisture sensor 10 is "1" (YES), that is, the moisture exists at step 21, the program proceeds to next step 22.

When the moisture signal output from the moisture sensor 10 is "0" (NO), that is, the moisture does not exist at step 21, the program repeats the same step 21 therefore, the wiper motor 5 is not supplied with an electric current from the output terminal 12e of the controller 12 and kept in the suspended state.

At step 22, the output R proportional to the rainfall from the vibration sensor 11 is read as the rainfall information.

The intermittent period T is calculated corresponding to the output R, which is inversely proportional to the output R at step 23. Namely, when the vehicle body 8 gets wet with dew or in the drizzling rain, the output R (vibration signal) is very small because the vibration caused by them is extremely weak, therefore the long intermittent period T is set in inverse proportion to the output R. When the vehicle body 8 gets wet in an ordinary rainfall the output R increases because of strong vibration caused by rainwater, and the short intermittent period T is set in inverse proportion to the output R.

At step 24, the electric current having the intermittent period set at step 23 is supplied to the wiper motor 5 from the output terminal 12e of the controller 12, and the wiper motor 5 is actuated.

By actuating the wiper motor 5 intermittently, the wiper blade 7 oscillates reciprocatingly on the windshield glass 9 through linkage 6, and wipes the surface 9a.

Therefore, the condensed dewdrops, the poured raindrops and the splashed water on the vehicle body 8 are wiped away from the wiped surface 9a.

Next, the moisture sensor 10 senses the presence of moisture again at step 25.

When the moisture signal output from the moisture sensor 10 is "1" (NO), that is, the moisture exists at step 25, the program returns to step 22, and the output R from the vibration sensor 11 is read afresh at step 22.

At step 23 the intermittent period T is set corresponding to the output R newly read in step 22, and the wiper motor 5 is supplied with the electric current having the new intermittent period T from the output terminal 12e of the controller 12 and actuated at step 24.

When the moisture signal output from the moisture sensor 10 is "0" (YES), that is, the moisture does not exist at step 25, the program proceeds to next step 26.

At step 26, the power supply to the wiper motor 5 is cut, and the wiper motor 5 stops after driving the wiper blade 7 as far as the predetermined stop position. After this, the program returns to step 21, and the moisture sensing is carried out again at step 21.

Although the moisture sensor 10 is disposed to the foremost part of the vehicle body 8, it may be disposed to the forefront of the hood 8b in the same manner as an ornament. And it may be disposed to a position easy to receive the rain and dew such as a front part of the roof of the vehicle body 8.

A second embodiment of the wiper apparatus according to this invention will be described below on basis of FIG. 4 to FIG. 6.

Figure 4:
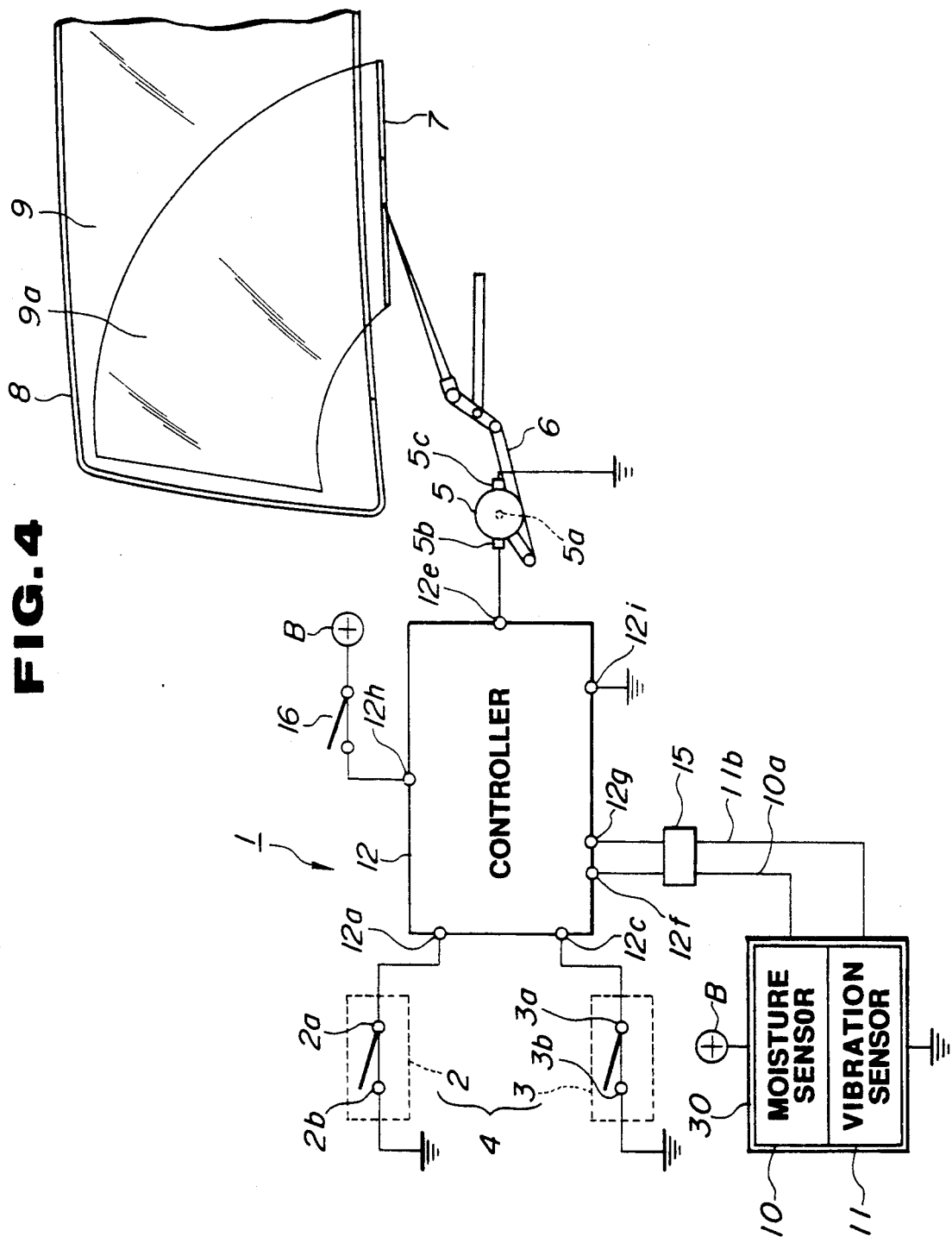
FIG. 4 is a schematic block diagram of a second embodiment of the wiper apparatus according to this invention.

The wiper apparatus 1 shown in FIG. 4 has the same construction substantially excepting that the moisture sensor 10 and the vibration sensor 11 are incorporated as a combined sensor 30.

The combined sensor 30 comprises the moisture sensor 10, the vibration sensor 11 and a casing 13, the moisture sensor 10 and the vibration sensor 11 are united and housed in the casing 13 as shown FIG. 5 and FIG. 6. The combined sensor 30 is disposed on the hood 8b of the vehicle body 8.

Namely, the combined sensor 30 is provided with the moisture sensor 10 on the upper face of a vibratory plate 11a of the vibration sensor 11 housed in the casing 13, and they are coated with a thin resinous film 14. And a piezo-electric device 11c disposed on the reverse face of the vibratory plate 11a.

The moisture sensor 10 and vibration sensor 11 are housed in a containing part 13b of a casing body 13c having the containing part 13b and a hook 13a for engaging an opening 8a provided in the hood 8b.

The upper side of the casing body 13c is covered with a casing cover 13e having a rectangular opening 13d to receive moisture and raindrops so as not to dislocate the moisture sensor 10 and the vibration sensor 11 at a state in which the projection 13e formed on the sidewall of the casing body 13c is engaged to a recess 13g provided to the casing cover 13.

The hook 13a of the casing body 13c is engaged to the opening 8c sundwiching a damper 13i between the casing body 13c and the hood 8b after passing an output wire 10a of the moisture sensor 10 and an output wire 11b of the vibration sensor 11 through the opening 8c from an aperture 13h bored in the casing body 13c on the side of the hood 8b, thereby securing the combined sensor 30 formed by incorporating the moisture sensor 10 and the vibration sensor 11 on the hood 8b of the vehicle body 8.

Furthermore, the output wires 10a and 11b are connected to a connector 15, the output wire 10a of the moisture sensor 10 is connected to the input terminal 12f through the connector 15 so as to input the moisture signal into the controller 12, and the output wire 11b of the vibration sensor 11 is connected to an input terminal 12g through the connector 15 so as to input the vibration signal into the controller 12.

The wiper apparatus 1 according to the second embodiment of this invention is also controlled in accordance with the flow chart shown in FIG. 3 similarly to the aforementioned first embodiment of this invention.

In the wiper apparatus 1 of this embodiment, it is possible to reduce man-hours required for the installation and possible to improve the productivity as comparted with the first embodiment because the moisture sensor and the vibration sensor are disposed on the vehicle body in one united body.

Next, a third embodiment of the wiper apparatus according to this invention will be described below on the basis of FIG. 7 to FIG. 9.

Figure 7:
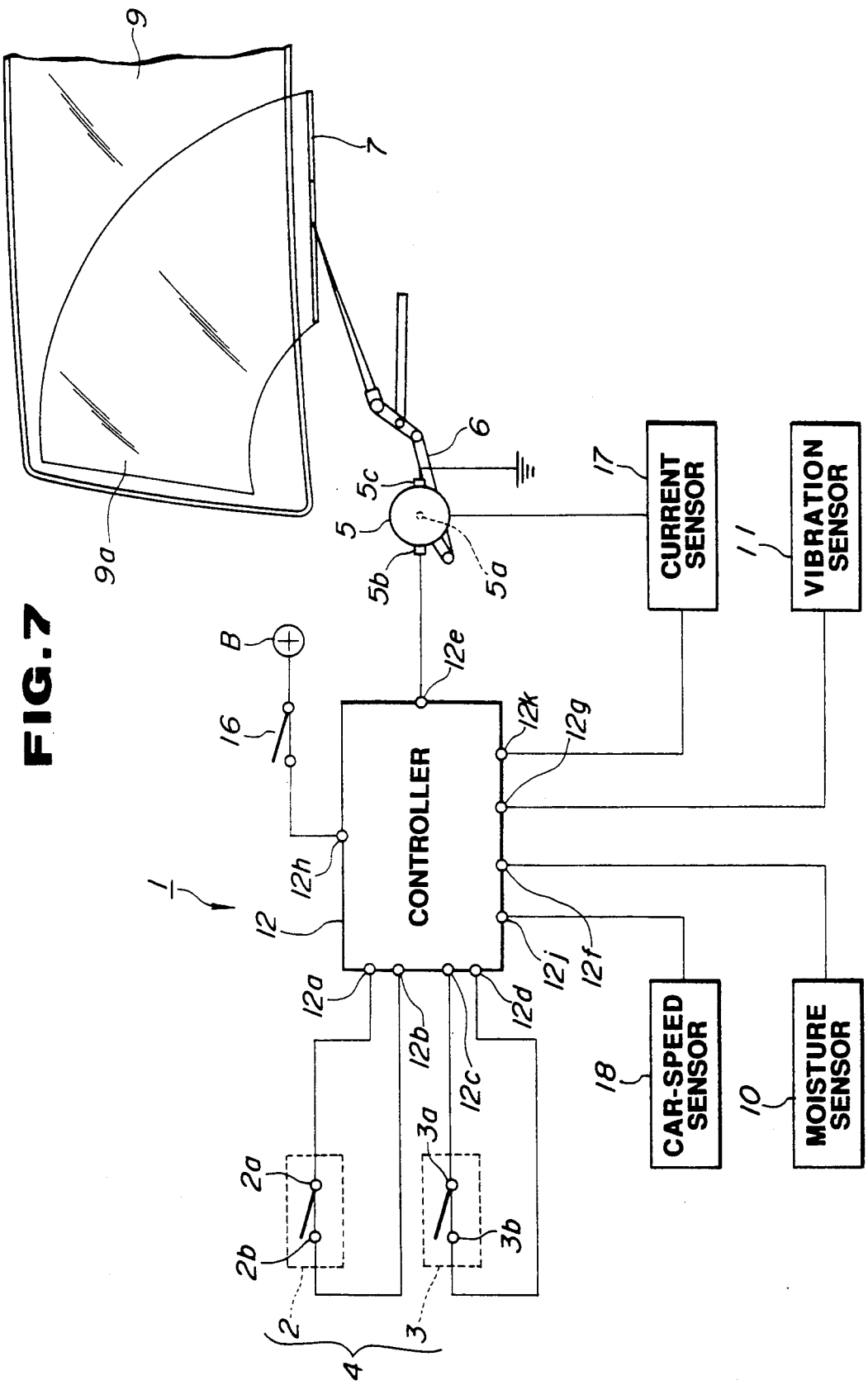
FIG. 7 is a schematic block diagram of a third embodiment of the wiper apparatus according to this invention.

Wiper apparatus 1 of the third embodiment shown in FIG. 7 is further provided with a current sensor 17 and a car-speed sensor 18 in addition to the construction of the aforementioned wiper apparatus of the first or second embodiment according to this invention and so designed as to control the wiper motor 5 by processing a motor-load signal output from the current sensor 17 and a car-speed signal output from the car-speed sensor 18 as well as the moisture signal and the vibration signal output from the moisture sensor 10 and the vibration sensor 11.

Namely, the wiper aparatus 1 shown in FIG. 7 is provided with the wiper switch 4 and the wiper motor 5 having the same structure as that of the wiper aparatus of the first embodimetn shown in FIG. 1. These are connected to the controller 12 in the same manner as the case of the first embodiment shown in FIG. 1.

The wiper apparatus 1 is provided with the current sensor 17 for sensing load applied on wiper motor 5 and outputting the motor load signal representing frictional resistance between the wiper blade 7 and the wiped surface 9a, the vibration sensor 11 for sensing a shock caused by raindrops and outputting the vibration signal representing intensity of the shock caused by the raindrops, the moisture sensor 10 for sensing presence of moisture and outputting the moisture signal indicating the presence of the moisture, the car-speed sensor for sensing an actual car-speed and outputting the car-speed signal indicating the actual car-speed, and the controller 12 for actuating the wiper motor 5 under the optimum condition (rotational speed and intermittent period) determined in accordance with the motor load signal, the vibration signal, the moisture signal and the car-speed signal output from the current sensor 17, the vibration sensor 11, the moisture sensor 10 and the car-speed sensor 18, respectively.

The current sensor 17 is connected to a brush (not shown) of the wiper motor 5 and an input terminal 12k of the controller 12 and so designed as to detect the frictional resistance of the wiper blade 7 at the time of wiping the wiped surface 9a by sensing a brush current flowing in the brush and to output the data signal to the controller 12 as motor load data i.

The vibration sensor 11 senses the vibration caused by collision of raindrops by the piezo-electric device and transform it into an electric signal. The vibration sensor 11 is connected to the input terminal 12g of the controller 12 and designed to output the data signal transformed from the vibration to the controller 12 as rainfalll data Ra.

The moisture sensor 10 had the same structure as described in the first embodiment of this invention, and senses the presence of moisture. The moisture sensor 10 is connected to the input terminal 12f of the controller 12 and designed to sense the presence of moisture and to output the electric signal to the controller 12 as moisture information.

The car-speed sensor 18 is so structured, for example, that a permanent magnet disposed to an indicator of a speed meter mounted to the vehicle is displaced against a coil attached on the meter panel of the speed meter, and senses the actual car-speed.

The car-speed sensor 18 is connected to an input terminal 12f of the controller 12 and so designed as to output the data signal to the controller 12 as car-speed data V.

The controller 12 is constructed from intergrated circuit (not shown) and so on, a power terminal 12h of the controller 12 is connected to the power source B through the main switch (ignition switch) 16 in the same manner as the case of the first embodiment of this invention.

The controller 12 controls the wiper motor 5 to rotate at suitable rotational speed Rw and intermittent period T according to the output from the moisture sensor 10 (moisture information), the output from the car-speed sensor 18 (car-speed data V), the output from the vibration sensor 11 (rainfall data Ra) and the output from the current sensor 17 (motor load data i) when the movable contact 2a is in contact with the fixed contact 2b by changing the automating switch 2 of the wiper swtich 4 to the ON-state.

Figure 8:
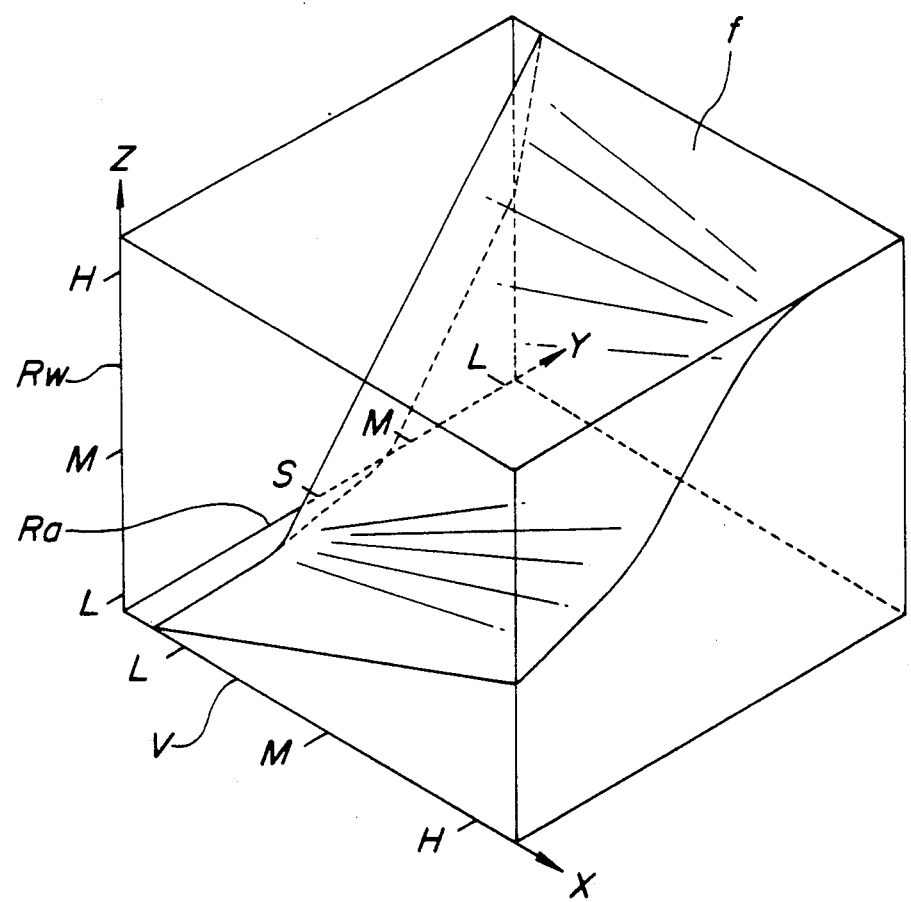
FIG. 8 is a three-dimensional graph illustrating the controlling function of the wiper apparatus shown in FIG. 7.
Figure 9:
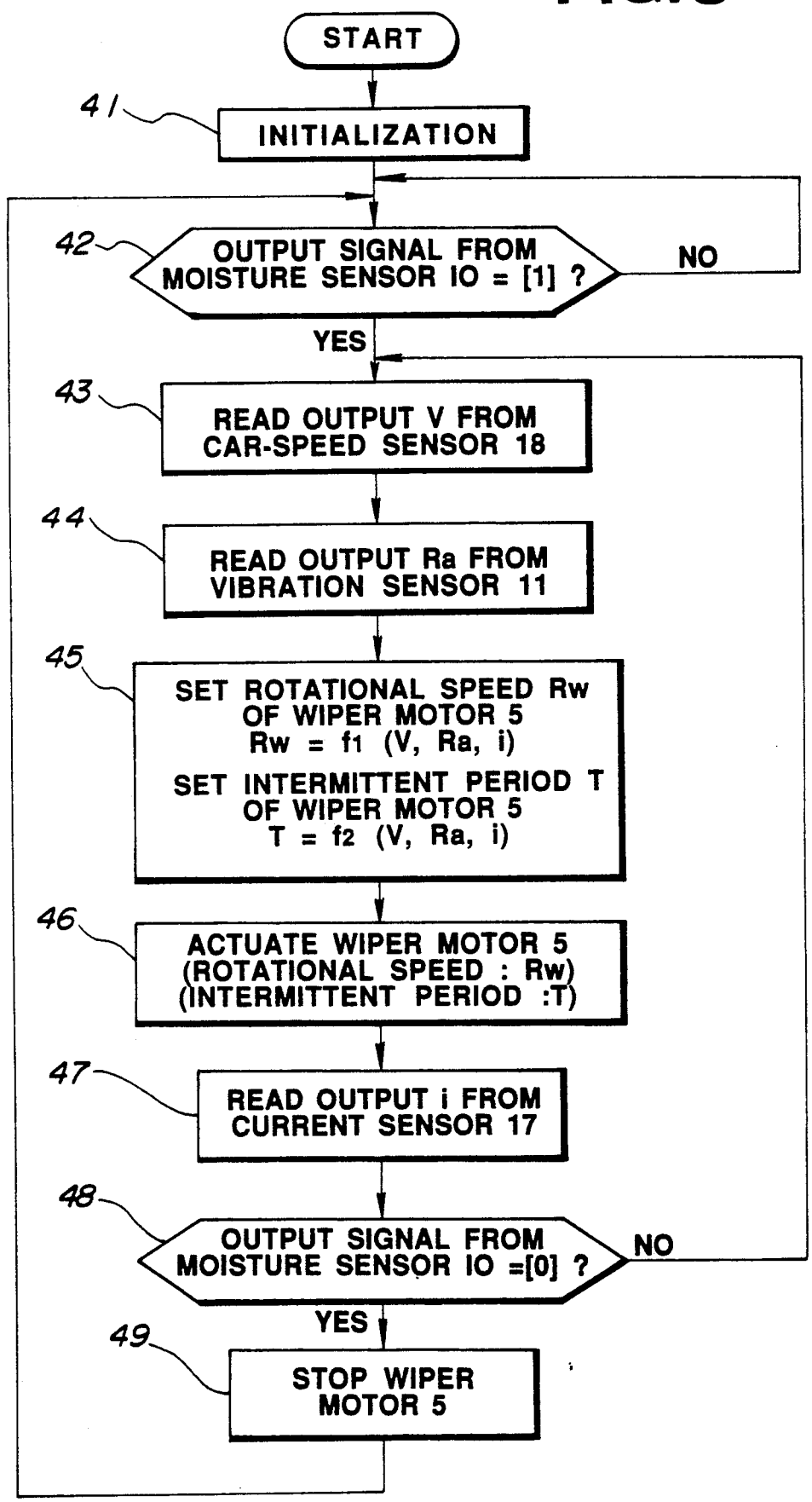
FIG. 9 is a flow chart explaining the control of the wiper apparatus shown in FIG. 7.

FIG. 8 is a three-dimensional graph showing a relationship among car-speed V, rainfall Ra and rotational speed Rw of the wiper motor 5.

The car-speed V, rainfall Ra and rotational speed Rw of the wiper motor 5 are read along the X, Y and Z axes, respectively in the graph, the rotational speed Rw of the wiper motor 5 becames higher according as the car-speed V increases and the rainfall Ra becomes larger, and the rotational speed Rw is indicated by the three-dimensional curved surface f in the figure. The wiper apparatus 1 is so controlled as to increase the rotational speed Rw of the wiper motor 5 in proportion to the increase of the car-speed V and the rainfall Ra.

Next, the control of the wiper apparatus 1 in this embodiment will be explained on the basis of the flow chart shown in FIG. 9.

At the state in which the main switch (ignition switch) 16 is switched ON, and the automating switch 2 of the wiper switch 4 is changed to the ON-state (usually, the automating switch 2 remains in the ON-state), respective memories in the controller 12 are initialized at step 41 in the first place.

At step 42, the moisture sensor 10 senses the presence of moisture. When the moisture signal output from the moisture sensor 10 is "1" (YES), that is, the moisture exists at step 42, the program proceeds to step 43. When the moisture signal output from the moisture sensor 10 is "0" (NO), that is, the moisture does not exist at step 42, the program repeats the same step 42, therefore the wiper motor 5 is not supplied with an electric current from the output terminal 12e of the controller 12 and kept in the suspended state.

When the output signal is "1" at step 42, the data signal output from the car-speed sensor 18 is read as car-speed data V at step 43.

At step 44, the data signal output from the vibration sensor 11 is read as rainfall data, and proceeding to step 45.

As step 45, the rotational speed Rw of the wiper motor 5 is calculated according to the output at present time from the car-speed sensor 18 (actual car-speed data V), the output from the vibration sensor 11 (rainfall data Ra) and the output from the current sensor 17 (motor load data i) as a function of V, Ra and i (Rw=f₁(V, Ra, i)). And the intermittent period T of the wiper motor 5 is also calculated according to the outputs from the car-speed sensor 18, the vibration sensor 11 and the current sensor 17 as a function of V, Ra and i (T=f₂(V, Ra, i)).

At this time, the motor load data i is not output from the current sensor 17 since the wiper motor 5 does not yet rotate, accordingly the above-mentioned rotational speed Rw and intermittent period T of the wiper motor 5 is culculated temporarily by using initial value chosen at step 41 instead of actual motor lead data i at only the first processing. And the rotational speed Rw and the intermittent period T are recalculated at and after the second processing by using actual motor load data i read at step 47.

At step 46, the wiper motor 5 is supplied with an electric current from the output terminal 12e of the controller 12 and actuated to rotate at the rotational speed Rw and the intermittent period T set at step 45.

According to the rotation of the wiper motor 5 under the aforementioned rotational condition, the wiper blade 7 oscillates reciprocatingly on the windshield glass 9 through the linkage 6 and wipes wiped surface 9a.

Therefore, raindrops on the windshield glass 9 are wiped away from the wiped surface 9a in the most suitable condition corresponding to the rainfall and the travelling speed even when the vehicle travels at high speeds as well as at low speeds and even when it rains heavily and lightly as a drizzling rain.

Next, the data signal output from the current sensor 17 is read as motor load data i at step 47. This data is used for calculating the rotational speed Rw and the intermittent period T at step 45 the next time. Namely, the rotational speed Rw and the intermittent period T of the wiper motor 5 are revised in accordance with the motor load data i because the frictional resistance of the wiper blade 7 at the time of wiping the wiped surface 9a increases when it stops raining while the wiper motor 5 works or when the vehicle goes into a tunnel in the case of traveling in the rain.

Further, the moisture sensor 10 senses the presence of moisture at step 48.

When the moisture signal output from the moisture sensor 10 is "1" (NO), that is the moisture exists at step 48, the program returns to step 43. Output V from the car-speed sensor 18 and output Ra from the vibration sensor 11 are read afresh at step 43 and step 44, respectively. At step 45, the rotational speed Rw and the intermittent period T are renewed in accordance with the motor load data i read at step 47, the car-speed data V and the rainfall data Ra renewed at steps 43 and 44 respectively. In such a manner, the following steps are processed.

When the moisture signal output from the moisture sensor 10 is "0" (YES), that is the moisture does not exist at step 48, the program proceeds to next step 49.

At step 49, the power supply to the wiper motor 5 is cut, and the wiper motor 5 stops after driving the wiper blade 7 as far as the predetermined stop position. After this, the program returns to step 42, and the moisture sensing is carried out again at step 42.

In the wiper apparatus 1 according to the third embodiment of this invention, it is possible to further reduce the manual operation as compared with the wiper apparatus according to the first or the second embodiment because the wiper motor 5 is controlled also considering the actual car-speed and the wiper load not only the rainfall.

As mentioned above, the wiper apparatus according to this invention comprises a wiper motor for driving a wiper blade, a wiper switch for selecting a mode between automatic and manual operation, a moisture sensor for sensing presence of moisture, a vibration sensor for sensing a shock caused by raindrops, a control means for actuating or stopping said wiper motor in accordance with a moisture signal output from said moisture sensor and a vibration signal output from said vibration sensor. Therefore, the wiper apparatus according to this invention does not work by any vibration other than that caused by raindrops. It is possible to wipe the windshield glass automatically in response to even dew or a drizzling rain because the wiper apparatus is so designed as to control the wiper motor in accordance with the presence of moisture and intensity of the vibration caused by raindrops. An excellent effect is obtained in that it is possible to focus attention on the driving operation since it is almost unnecessary to operate the wiper switch by manual operation while the vehicle is running.

It is possible to reduce the cost by incorporating the moisture sensor and the vibration sensor because the man-hour required for the installation decreases and the productivity is improved.

Furthermore, the wiper apparatus according to this invention becomes possible to wiper the windshield glass full-automatically wihtout manual operation substantially by further providing a current sensor for sensing wiper motor load and a car-speed sensor for sensing an actual car-speed because it is possible to rotate the wiper motor at the most suitable rotational speed and the optimum intermittent period corresponding to the actual car-speed and the wiper load as well as the rainfall.

What is claimed is:

1. An automatic windshield wiper apparatus for a motor vehicle comprising:
   a wiper blade for the vehicle's windshield;
   a wiper motor for driving said wiper blade;
   wiper switch means for selecting between automatic and manual mode of operation;
   a combined sensor having a moisture sensor for sensing the presence of moisture, said moisture sensor is provided on the upper face of a vibratory plate, said vibratory plate and a piezo-electric device which is disposed on one face of said vibratory plate, serve as a vibration sensor for detecting vibration caused by raindrops on the other face of said vibratory plate; and
   a control means for controlling said wiper motor according to a moisture signal provided by said moisture sensor, and according to a vibration signal provided from said vibration sensor, said control means operable for actuating and stopping said wiper motor, in accordance with the moisture and vibration signals.

2. An automatic windshield wiper apparatus for a motor vehicle comprising:
   a wiper blade for the vehicle's windshield;
   a wiper motor for driving said wiper blade;
   a wiper switch for selecting automatic and manual modes of operations;
   a combined sensor having a moisture sensor for sensing the presence of moisture, said moisture sensor is provided on an upper face of a vibratory plate, said vibratory plate and a piezo-electric device which is disposed on one face of said vibratory plate, serve as a vibration sensor for detecting vibration caused by raindrops on the other face of said vibratory plate;
   a current sensor for detecting a load applied on said wiper motor during driving of said wiper blade;
   a car-speed sensor for detecting an speed of the vehicle; and
   control means for actuating said wiper motor with an intermittent period which is determined in accordance with a motor load signal provided from said current sensor, a car-speed output signal provided from said car-speed sensor and a vibration output signal provided from said vibration sensor.

3. The automatic windshield wiper apparatus as defined in claim 2, wherein said control means actuates said wiper motor at a rotational speed determined in accordance with the motor load output signal provided from said current sensor, the car-speed output signal provided from said car-speed sensor and the vibration output signal provided from said vibration sensor.

4. The automatic windshield wiper apparatus as defined in claim 3, wherein said control means further actuates the wiper motor at a time of sensing the presence of moisture by said moisture sensor.

5. A method of automatically controlling a wiper apparatus for a motor vehicle, the method comprising the steps of:
   detecting a vibration caused by raindrops;
   detecting a speed of said vehicle;
   rotating a wiper motor at a predetermined rotational speed;
   detecting a current flowing in said wiper motor;
   calculating an intermittent period of the wiper motor according to the detected vehicle speed, the detected vibration and the detected current; and
   controlling said wiper motor during an intermittent operation in accordance with the calculated intermittent period.

6. The method as defined in claim 5 wherein said calculating step further includes calculating a rotational speed of the wiper motor according to the detected vehicle speed, the detected vibration and the detected current; and wherein said controlling step further includes controlling the wiper motor operation in accordance with the calculated rotational speed and the calculated intermittent period.

7. The method as defined in claim 6, further comprising the step of sensing a presence of moisture.

* * * * *